(12) United States Patent
Mullen

(10) Patent No.: US 8,739,070 B2
(45) Date of Patent: May 27, 2014

(54) SYSTEM, METHOD AND APPARATUS FOR PROVIDING AN APPLICATION CAROUSEL

(71) Applicant: WMODE Inc., Calgary (CA)

(72) Inventor: Thomas Mullen, Calgary (CA)

(73) Assignee: WMODE, Inc., Calgary (CA)

( * ) Notice: Subject to any disclaimer, the term of this patent is extended or adjusted under 35 U.S.C. 154(b) by 0 days.

(21) Appl. No.: 13/666,804

(22) Filed: Nov. 1, 2012

(65) Prior Publication Data

US 2013/0111407 A1    May 2, 2013

Related U.S. Application Data

(60) Provisional application No. 61/554,339, filed on Nov. 1, 2011.

(51) Int. Cl.
*G06F 3/048* (2013.01)
(52) U.S. Cl.
USPC ........................................................ 715/834
(58) Field of Classification Search
None
See application file for complete search history.

(56) References Cited

U.S. PATENT DOCUMENTS

| | | | |
|---|---|---|---|
| 5,485,197 A | 1/1996 | Hoarty | |
| 5,515,486 A | 5/1996 | Amro et al. | |
| 6,016,145 A | 1/2000 | Horvitz et al. | |
| 6,466,237 B1 * | 10/2002 | Miyao et al. | 715/838 |
| 7,013,435 B2 | 3/2006 | Gallo et al. | |
| 7,882,356 B2 | 2/2011 | Klemets et al. | |
| 8,185,949 B2 | 5/2012 | Jonsson | |
| 8,224,939 B2 | 7/2012 | Hyvarinen et al. | |
| 2004/0083303 A1 | 4/2004 | Hwang | |
| 2008/0034314 A1 * | 2/2008 | Louch et al. | 715/778 |
| 2010/0125907 A1 | 5/2010 | Jonsson | |
| 2010/0332670 A1 | 12/2010 | Park et al. | |
| 2011/0010591 A1 | 1/2011 | Damola et al. | |
| 2012/0278722 A1 * | 11/2012 | Raleigh et al. | 715/735 |
| 2013/0111407 A1 * | 5/2013 | Mullen | 715/834 |

* cited by examiner

*Primary Examiner* — Matt Kim
*Assistant Examiner* — Maryam Ipakchi
(74) *Attorney, Agent, or Firm* — Antony C. Edwards

(57) ABSTRACT

A method for providing an application carousel includes providing a self-service website for a third party partner supplier to create, select or group apps in a unique app carousel created by the supplier in the website. Blogs, reviews or comments may be provided in association with a GUI of the app carousel to promote the app carousel. The supplier populates the app carousel with app icons which may be rotated about a looped carousel display track. The app carousel is then exposed for location by consumers via their electronic devices and associated browsers.

18 Claims, 8 Drawing Sheets

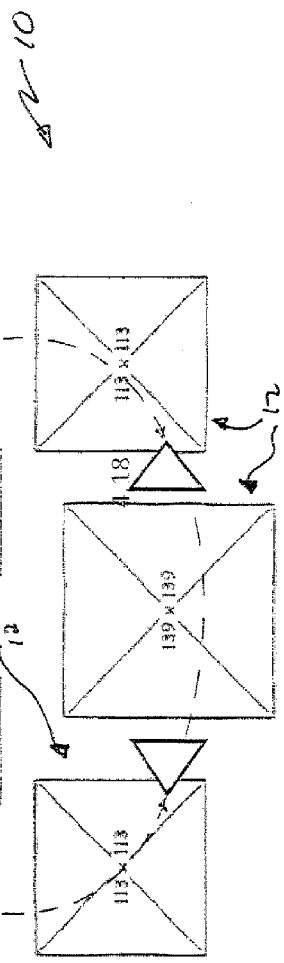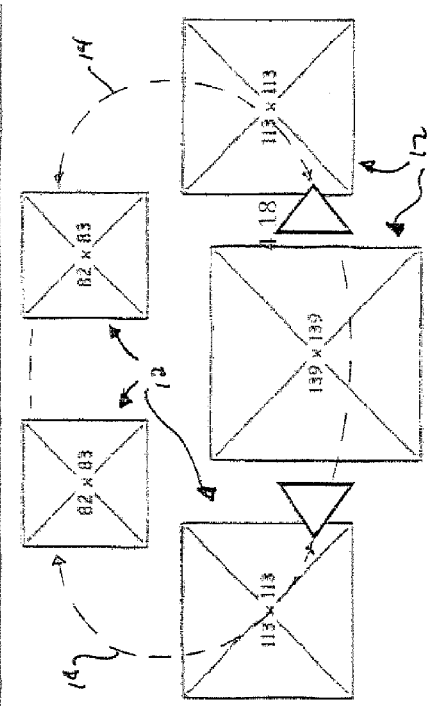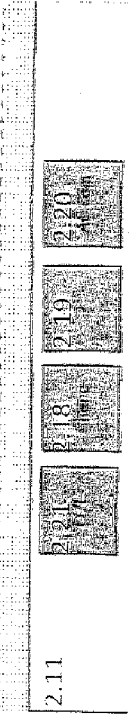

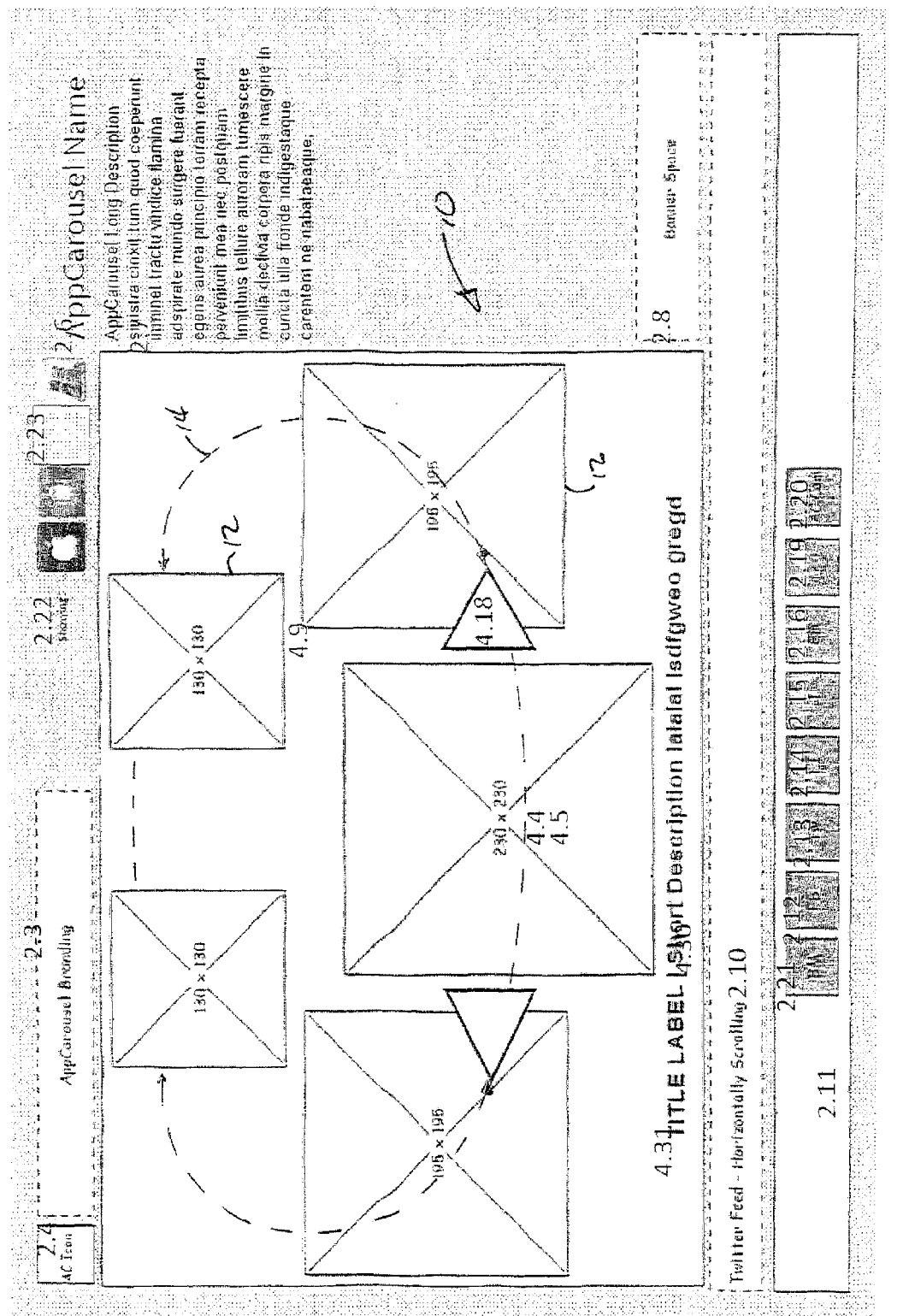

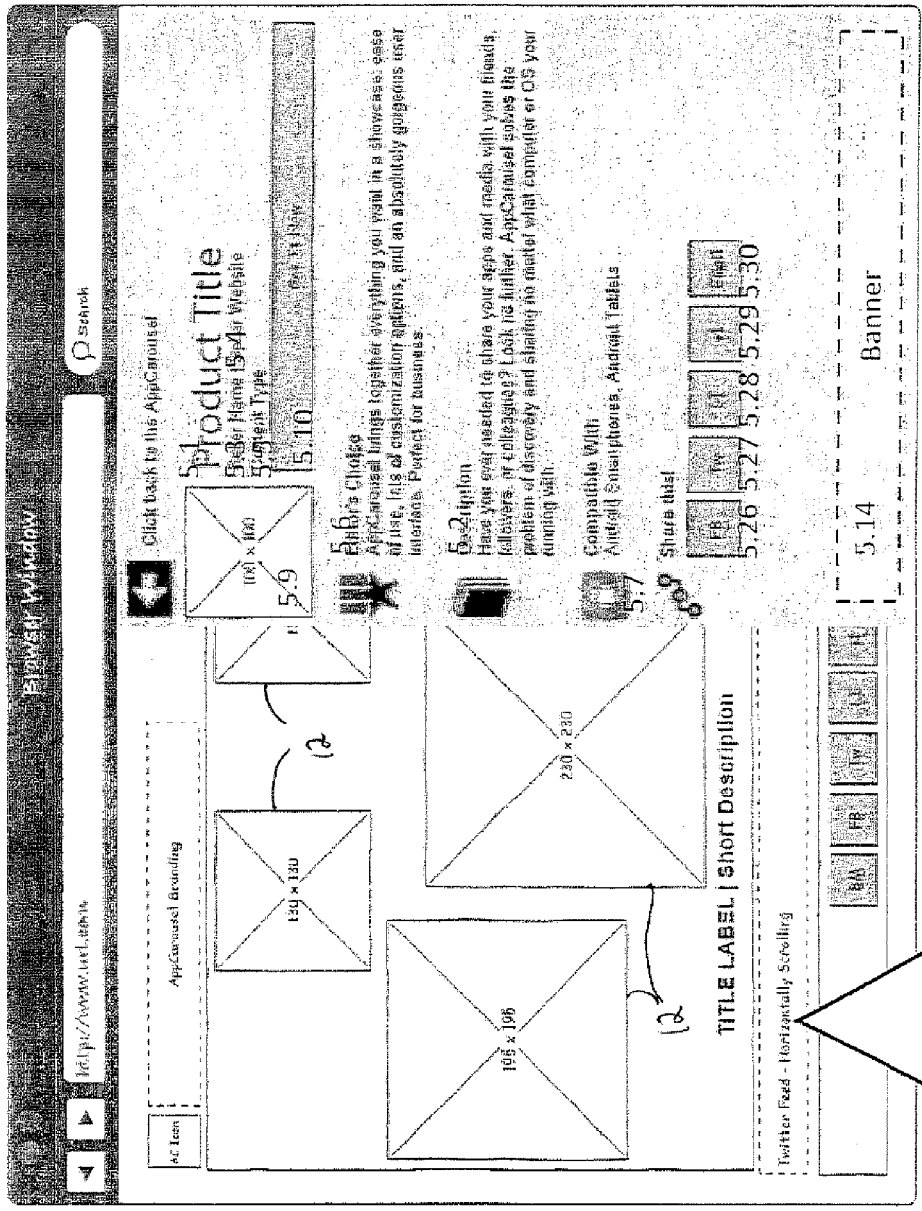

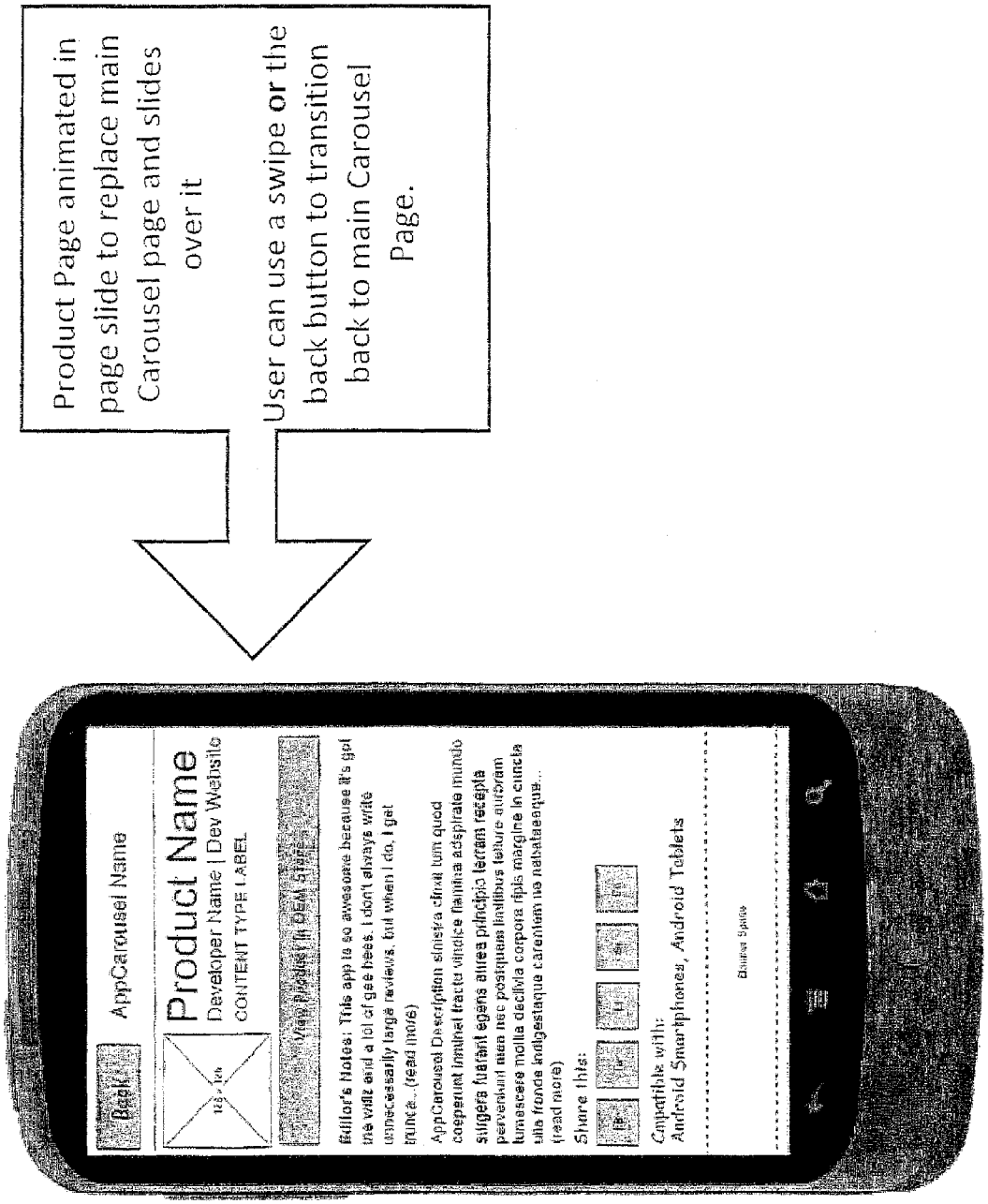

SYSTEM, METHOD AND APPARATUS FOR PROVIDING AN APPLICATION CAROUSEL

FIELD OF THE INVENTION

This invention relates to the field of carousel type graphical user interfaces for computer displays and in particular to a method and apparatus for assisting a user to discover useful apps from amongst the growing unmanageable clutter of apps being made available to users of smart phones, tablet or laptop or other mobile computers, desktop computers, televisions, internet browsers or the like.

BACKGROUND OF THE INVENTION

Application software, also known as an application or an "app", is computer software designed to help the user to perform specific tasks. Examples include enterprise software, accounting software, office suites, graphics software and media and game players. Apps may be bundled with the computer and its system software, or may be published separately. Many apps, indeed in the hundreds or thousands, are available to users of so-called smart phones or other forms of handsets, tablet and desktop computers, internet browsers, etc, and may now be, or may soon become available on suitably connected televisions or other visual display appliances. The apps are supplied by third party programmers and made available to users via the internet or otherwise by browsing, streaming or download, sometimes from what is referred to as an "app store", that is, a virtual store or warehouse providing apps for purchase. Some app stores, or suppliers of handsets or other mobile devices, screen the apps before making them available to users. Other suppliers do not.

What is needed, and which it is an object of the present invention to provide, is to simplify a user's task in reviewing and finding useful new apps by the provision of an app that assists third parties in organizing and displaying on a carousel app icons grouped by subject matter or theme in common. Advantageously, app reviews may also be provided to assist a user browsing for apps. In other words, the problem that is solved is app discovery; namely the technical problem solved is that presently the consumer must navigate a lot of apps in an app store to identify apps that are desired or otherwise relevant to them.

In one aspect of the present invention the online social networks, app supplier content managers, and bloggers review and recommend apps such that the consumer does not have to search and download apps all the time to find the useful ones.

In the prior art applicant is aware of the following United States patents; namely:

U.S. Pat. No. 5,485,197 which issued Jan. 6, 1996, to Hoarty for a Carousel Display discloses an interactive television system having means for displaying a "carousel" to allow the user to make a menu selection. As disclosed, the carousel displays a plurality of menu items on each face of the carousel. The carousel rotates about a single central vertical axis.

U.S. Pat. No. 5,515,486 which issued May 7, 1996, to Amro et al for a Multi-Axis Rotatable Display discloses a graphical user interface in the form of a polyhedron display container. Each face of the polyhedron contains icons associated with an application and "workspace switches" which allow the user to switch between active applications. The central front panel of the polyhedron is the active panel. The user may select a new face of the polyhedron to be the active panel. In doing so, the polyhedron rotates a band of faces about a vertical, horizontal or diagonal axis to provide a new central active panel.

U.S. Pat. No. 6,016,145 which issued Jan. 18, 2000, to Horvitz et al for a Method and Apparatus for Transforming the Geometrical Shape of a Computer Display Window discloses a graphical user interface that displays multiple windows within a plurality of planes. The planes in the preferred embodiment represent the walls, floor and ceiling of a room. Windows may be moved between planes and are resized and reshaped accordingly. For example, a window on the back wall will appear smaller than a window on the front wall. Windows are tiled or stacked over other windows that may occupy the same plane. Thus the windows are "hung" upon a plane, that is, upon a wall of the room.

U.S. Pat. No. 7,013,435 which issued Mar. 14, 2006, to Gallo et at for a Three Dimensional Spatial User Interface For A Computing Device discloses a user interface which appears three dimensional and which is projected onto a two-dimensional display. The user interface includes a plurality of portals containing content, and a plurality of sensory cues. The plurality of portals are arranged in a three dimensional graphical representation such as a sphere for display to a user. For each of the portals, an application permits user interaction with the content contained therein. A sensory cue is displayed in each portal that provides a cue to the content contained therein. The user interface is adapted to change, based on the content contained in one or more portals of the user interface. One or more geometric properties of the portals change dynamically, so that the graphical representation displayed to the user is changed. The changes include changes to the shape of the user interface, the shape of one or more portals or the arrangement of portals of the user interface.

U.S. Pat. No. 6,335,737 which issued Jan. 1, 2002, to Grossman et al for a Video Display and Selection on a Graphical Interface discloses a graphical depiction of a carousel containing the icons or windows. These icons or windows are rotated into or out of view as the carousel rotates. Rotation can be controlled by mouse driven cursor, keyboard, application software, etc. Various identifying characteristics can be used to help users search through windows; for example, the title text of each window may be visible when the windows are in the carousel. Color can be an additional identifying characteristic. In instances where a large number of icons are used, this is a means for consolidating them. Multiple carousels can be used to consolidate different kinds of windows, icons, or TV broadcasts.

U.S. published patent application US 2009/0204929 A1, published Aug. 13, 2009, for the application of Baurmann et al, and entitled Favorite GUI for TV, discloses a carousel type of display for displaying icons representing user-defined favorites that is overlaid on the current background video of the television. The center-most icon is enlarged and displays the current video being viewed. Other icons can represent photos, music files, games, etc. The icons are displayed in a horizontal line and are revolvable. Live video is displayed in icons representing television channels.

U.S. published patent application US 2009/0172090 A1, published Jul. 2, 2009, for the application of Lit, and entitled Information Display System and Method, discloses a system and method for displaying graphics, text, animation, video and other content. In one embodiment of the invention, the system comprises a three-dimensional "Display Carousel" system. The system may include one or more display windows, each of which is capable of displaying different content. The configuration of the windows may give the appearance of rotating like a carousel and also of the carousel and/or images being three-dimensional. Other features of the invention may include functionality which permits the uploading and downloading of content, statistical data gathering, and revenue generation.

SUMMARY OF THE INVENTION

The following is a brief summary of a method according to one aspect of the present invention; which may be characterized as including the steps of:

(a) Providing a third party partner supplier with a means to create, select or group apps from the third party supplier in a unique app carousel created by the third party supplier n a self-serve website, wherein the apps are selected or grouped according to a theme or subject matter that their apps have in common, and wherein the third party supplier is provided with a means to provide a title for the app carousel and is provided with a means to blog and otherwise provide review or comments at least in association with a graphical user interface or GUI of said app carousel to promote the app carousel.

(b) Providing the third party supplier access to the unique app carousel, unique for a particular selected group of apps selected or grouped by the third party supplier, and allowing the third party supplier to populate their unique app carousel with app icons on a carousel display track, wherein said app icons correspond to said apps, and wherein the track appears on a corresponding app carousel GUI as an inclined rotational track which the user perceives as being inclined away from the screen so that app icons at the front of the track, which track may or may not be visible, are larger than icons which have rotated to the back of the track. Advantageously a center position on the front of the track corresponds to the largest icon. The icons are linked for display to corresponding content pages which may contain the blog or reviews or comments, from which an app may be selected for download, and wherein the app carousel may be selected for sharing on-line or on the social web, etc.

(c) Exposing the app carousel, once populated with selected apps or groupings of apps, to the internet for example for location by on-line search engines or browsers or the like so as to expose app carousels to the consuming public via their electronic devices including handsets including smart phones, or via tablet or mobile or desktop or personal computers, or via television or other display appliances.

The app carousel is assembled by the third party supplier, otherwise referred to herein as a partner, is identified or named (herein referred to as being given a title) and uploaded for viewing by users on the display of a mobile device such as a smart phone, tablet computer, or other computer, or on any interne browser, or on a television or other display appliance. The app carousel displays the app icons as they would appear on a looped, for example, substantially elliptical, track which recedes from a closer front portion of the track to a remote back portion of the track. Push, click, slide or swipe commands or any combination of these commands cause the icons to appear to rotate in either left or right directions along the front portion of the track, and so to circulate the remaining icons sequentially and simultaneously around the track in the corresponding direction. The icons reduce in size as they appear to recede around to the back portion of the track, and increase in size as they come to the front portion of the track. The center position on the front portion of the track appears most to the foreground and thus the icon in that position is largest.

BRIEF DESCRIPTION OF THE DRAWINGS

FIG. 1 is a graphical representation of one example of the GUI according to one aspect of the present invention, wherein icons representing apps are grouped together on a displayed app carousel having been selected for the grouping according to a theme or subject matter common to the selected and displayed apps. The app icons may be swiped, dragged, pushed, pulled, etc so an inclined elliptical, circular etc track such that the legible face of the icon is always kept oriented towards the user and so that at least part of the icon text for every app icon, e.g., the title of the app, is legible at all times on the GUI.

FIG. 2 shows the app carousel of FIG. 1 as it may in one embodiment appear on a website.

FIG. 3 shows the app carousel of FIG. 2 wherein a small product page display window is overlaid onto part of the app carousel display in response to a query such as a click, push or touch by a user onto a corresponding icon on the app carousel so that the user can read a description of the selected app in the small display window.

FIG. 4 is a representation of an example of an app description on a displayed content page on a mobile device as it appears overlaid over the corresponding app carousel behind the content page.

DESCRIPTION OF EMBODIMENTS OF THE INVENTION

Figure 5:
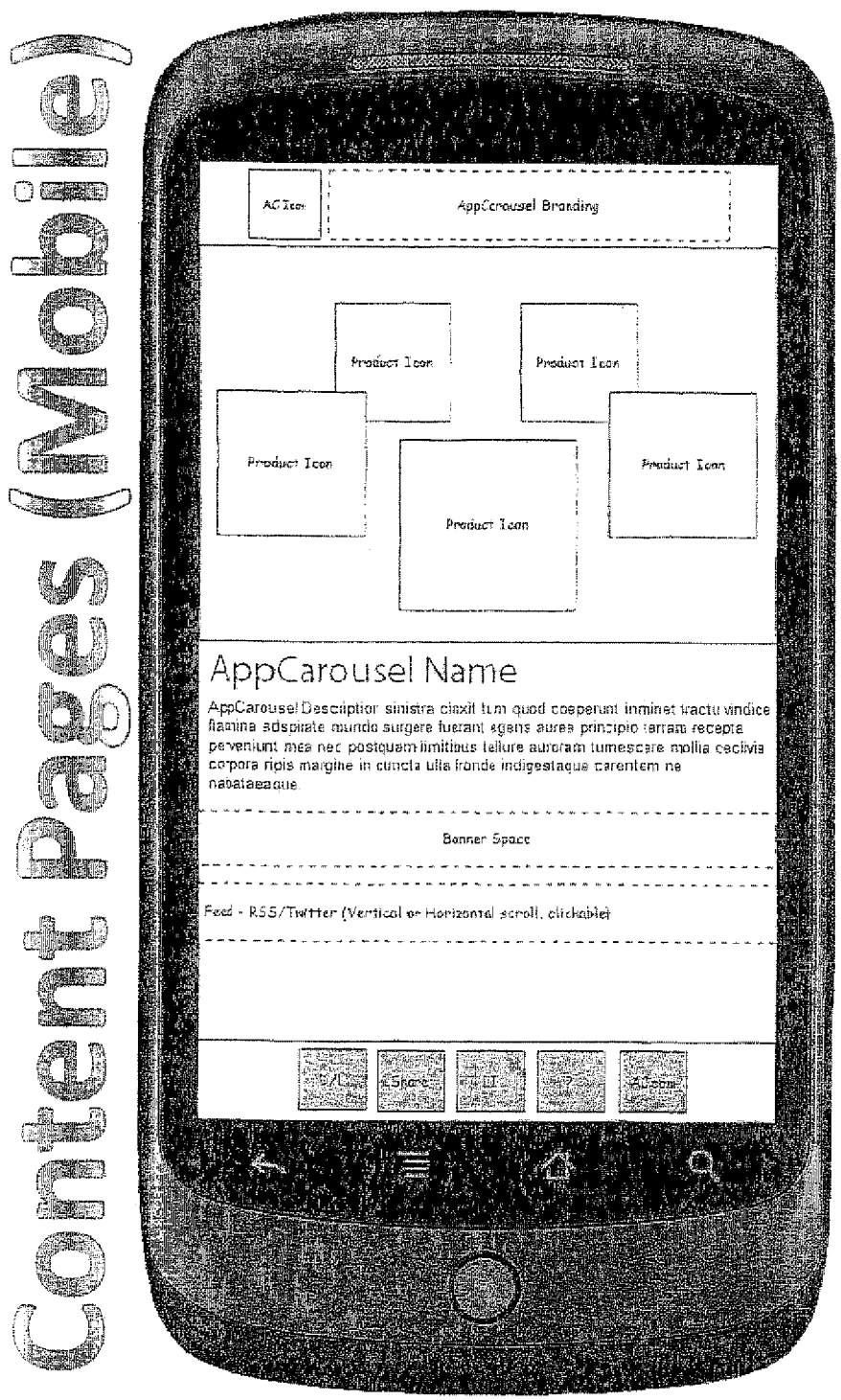
FIG. 5 is a representation of the mobile device of FIG. 4 showing the app carousel from which the content page of FIG. 4 was selected.
Figure 6:
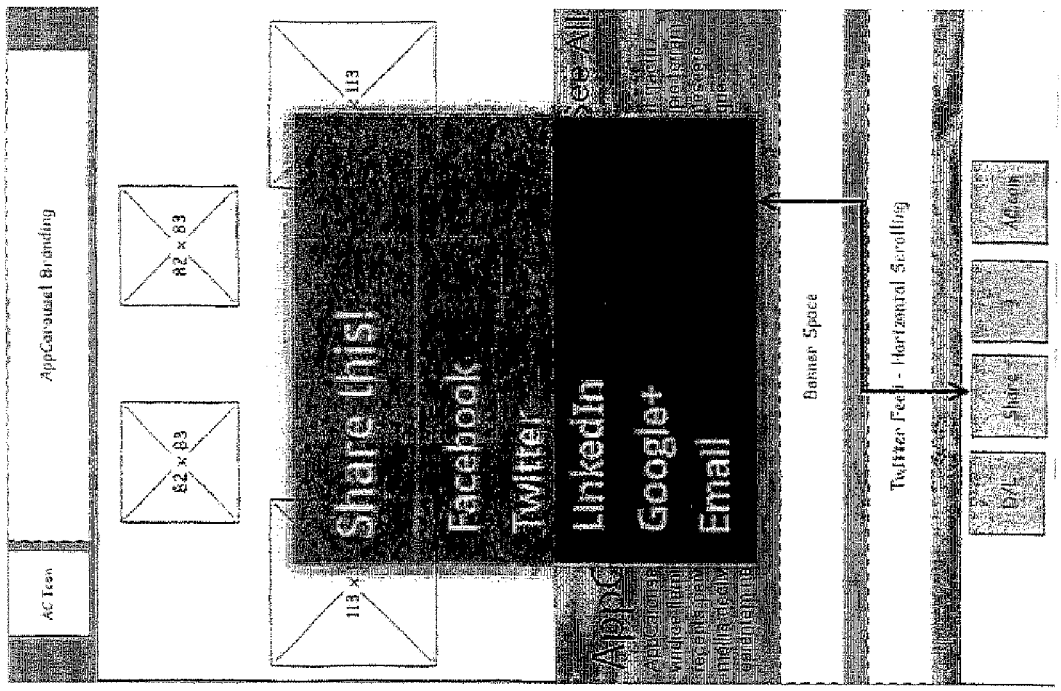
FIG. 6 is an example of an app carousel on a mobile device showing the share screen once a user has actuated the "share" button or icon.
Figure 7:
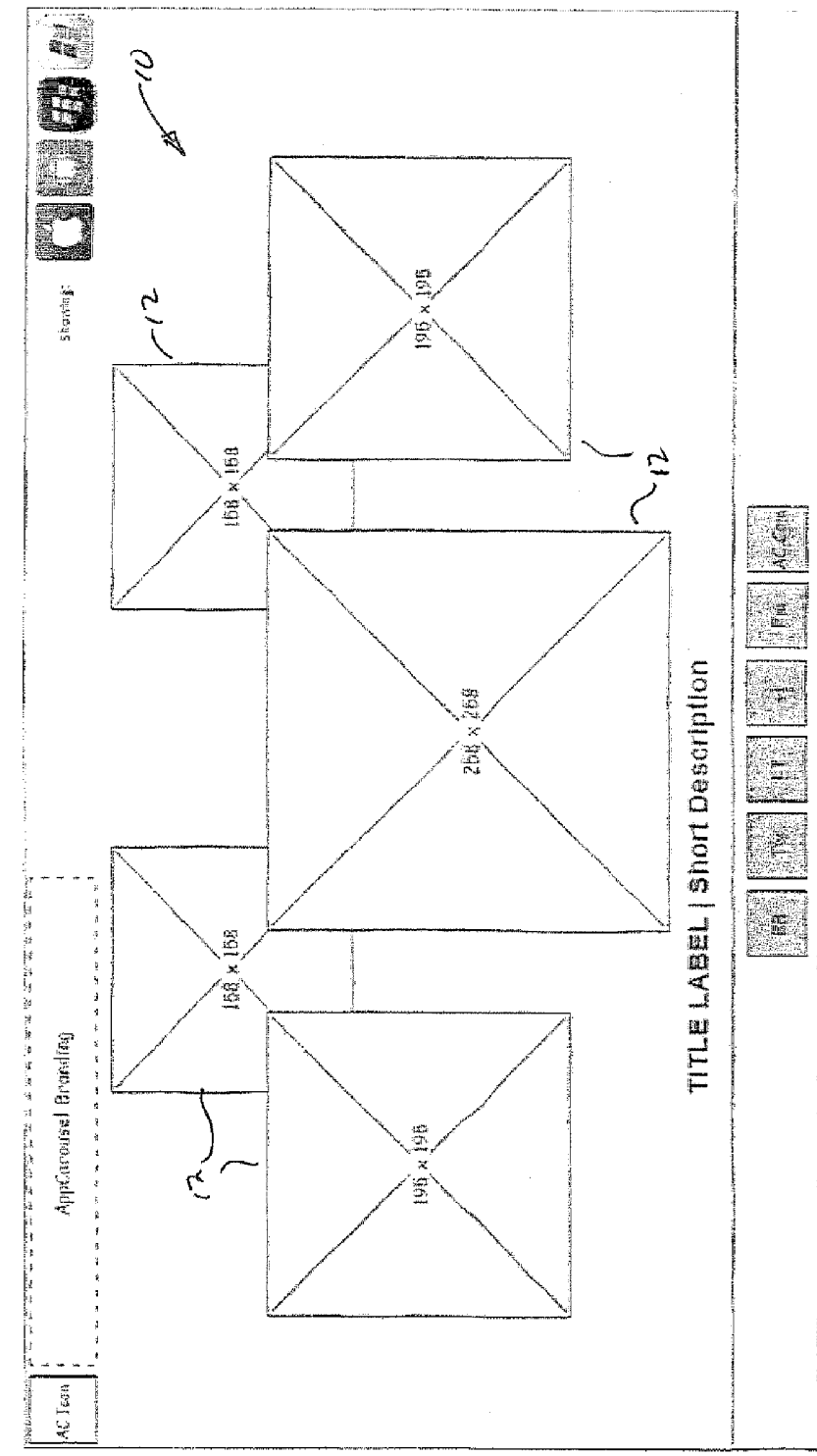
FIG. 7 is a representation of how an app carousel may appear as an embedded object where, again, as in FIG. 1, the app icons revolve around a substantially looped arcuate, such as elliptical, track so that the app icons appear to rotate to the foreground to an enlarged prominent center position opposite to icons which are reduced in size, but still having legible content in the background as they selectively revolve around the track for user review and selection of the associated content pages to give the user a more full description of the app before purchase and/or download.

Third parties such as bloggers, companies and consumers are given the ability to create lists of apps that they feel are useful to solve a specific problem e.g. travel apps for travelers visiting Spain, or which otherwise have some subject matter or theme in common. The blogger, company or other third party supplier is provided with a web site or app or widget that they can distribute to consumers to promote their selected apps.

A consumer will access the app carousel web site or widget which, according to one aspect of the present specification, which will display the bloggers selected apps. The consumer selects an app and is re-directed to the corresponding app store where the consumer can download the app.

Once the app carousel is configured a number of ways are generated for the consumer to discover the app carousel. These include without intending to be limiting: a mobile browser based web site, a PC or other browser based web site, a television or other display appliance interactive website or other site allowing a browser-like experience, an Apple™ app, an Android™ app, an app on any other operating system providing for a browser-like experience, a widget framework Advertising is sold for use in association with the app carousels. Some app carousels will be premium and paid for by the consumer brand. Some app carousels will lead to purchases from a commercial app store, in which case the app store may pay a royalty.

Browser based Javascript may be used to create an interesting and responsive consumer interface such as illustrated for example. This involves device capability profiling on the device and, changing user interface elements based on the performance of the device. The app carousel application software provides the consumer with an interesting animation as the carousel rotates the app icons around a virtual inclined elliptical track. The effect is created in a browser using HTML and Javascript as would be known to one skilled in the art.

Thus as seen in the accompanying illustrations wherein like reference numerals denote corresponding parts in each view, the app carousel 10 uses a rotating inclined elliptical wheel of images to present the user or consumer with a set of app 12 images to view and select. The app images rotate around the ellipse or otherwise looped path, for example more or less around the rearwardly inclined track 14, that is, inclined up and away from the user as perceived by the user viewing the GUI, the path shown in dotted outline in FIGS. 1 and 2, so as to always have the app "image" legibly facing forward, i.e. towards the user, thus maximizing the number of images visible to the consumer. As the app images rotate around the track they get smaller thus allowing the number of app images or icons in the app carousel to be increased and still remain usefully visible and thus useable by the consumer. For example, the title of each app image should be legibly visible at all times as the app images rotate around the track, even when in some embodiments due to display size constraints the rearmost app imaged will be overlapped, so as to be occluded by, the foremost app images. Advantageously each image, or for example an associated page linked to the image and accessible by for example clicking or tapping on the image, provides a review or commentary blog on the app.

The application software for the app carousel takes the following attributes into account to calculate the horizontal and vertical radius of the carousel: Screen dimensions, Screen size in pixels, Carousel pixel area on screen, Device browser, Tablet, smartphone, PC, TV, etc, Landscape or portrait display mode, Master image size, Number of app images in the carousel, Target range of app image sizes between front and back of the carousel, Z Scale, Zoom factor, 360 degree Rotation Speed as a time profile, the form of user rotate commands, e.g., swipe, button (left and right). A user "bring to front" command may be provided to instruct the carousel to bring a background image to the front of the carousel.

Using this information the following is calculated: Vertical and horizontal radius for the carousel, Image resizing algorithm as the image rotates around the carousel from front to side to back to side to front, Optimal center position of the ellipse for the track, Image position, Image size, Image layering.

Figure 8:
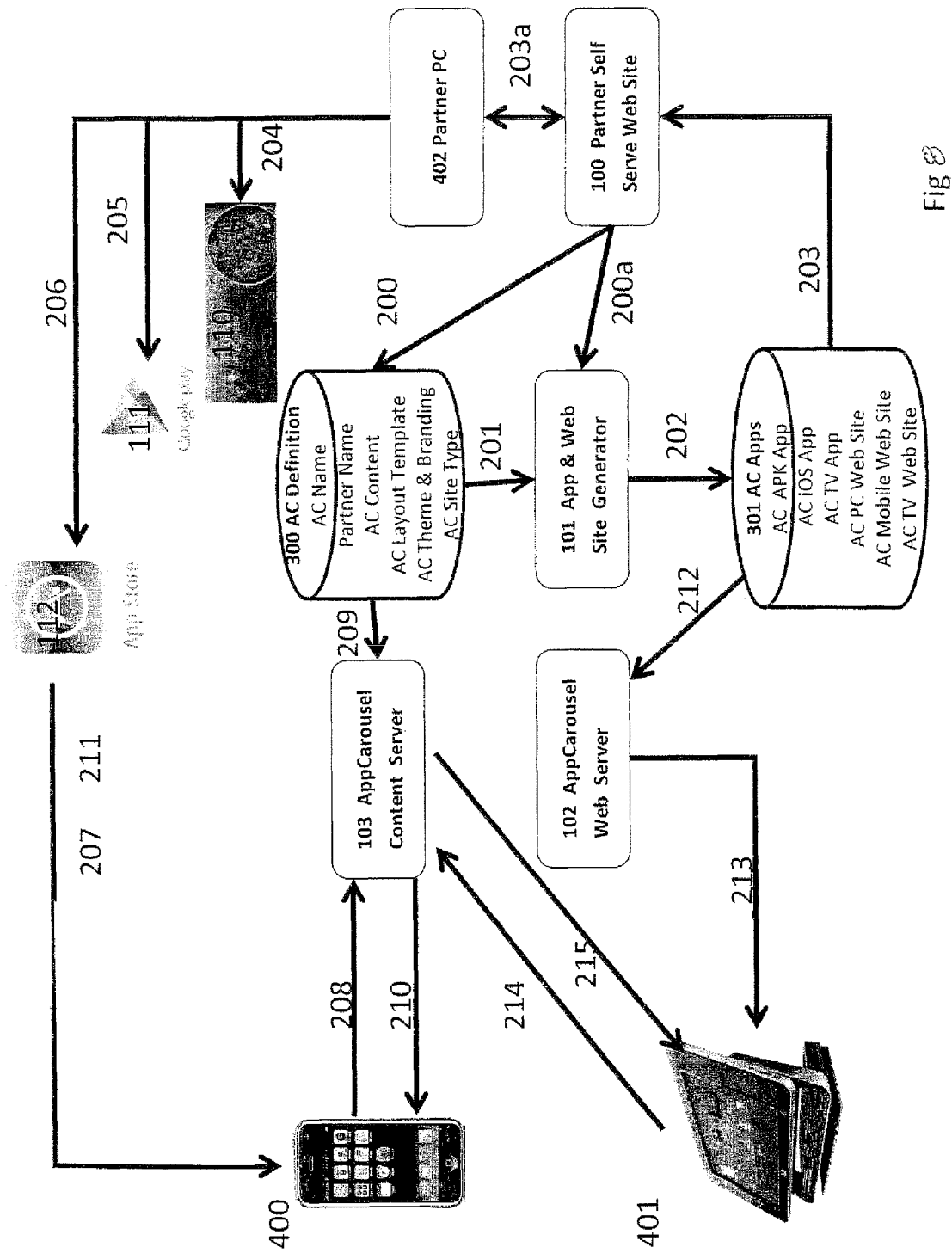
FIG. 8 is a diagrammatic representation of a system according to one embodiment of the specification.

An overview of one embodiment of the system is provided in FIG. 8. As used in FIG. 8 and herein the acronym "AC" denotes the phrase "App Carousel". What follows refers to the system components or modules.

App Carousel Definition database 300 includes the following:
- (a) a third party supplier (herein also referred to as a partner) Partner Name, as each app carousel belongs to a partner account.
- (b) App Carousel Name, as each app carousel has a unique name.
- (c) App Carousel Layout Template, as the app carousel software supports a number of layouts, one of which is selected by the partner as the template basis of their App Carousel. A Layout consists of a rendering such as of the rotating carousel of icons. Each Layout is available in multiple form factors including mobile, tablet, PC and TV. A form factor is optimized for a screen size and device input/output capabilities. Each App Carousel Layout Template consists of HTML5 (CSS, HTML and JavaScript) or similar scripting language.
- (d) App Carousel Content, as meta data for the multiple apps that are presented in the partners app carousel. Each app has meta data to locate the app in each of the supported app stores. For example, if one of the apps in App Carousel Content is Twitter, then the Twitter app definition will include product identifier information in all the supported platform app stores (e.g. Apple™, Android™, Panasonic™.) Each app may also include curated comments and editorial text provided by the blogger to reflect his opinions on the application. The blogger may be a content manager whos function it is at the partner to monitor, edit, source and/or provide app content, and app reviews, commentary, descriptions or the like.
- (e) App Carousel Theme and Branding, as partners can upload color definitions and logo's associated with their blog or consumer facing brand.
- (f) App Carousel Site Type, whether free or premium, as some sites are free to the partner, and others are premium, paid for by the partner. The app carousel site may be funded, at least in part, by advertising on the site.

Based on App Carousel Definitions the system will create deployable App Carousel Apps 301 for major platforms such as set out below, which are not intended to be limiting. A set of App Carousel Apps are associated with a specific App Carousel Name. An App Carousel App is for example a wrapped HTML5 web app or a translation of the HTML5 to a native app language such as Objective C. App Carousel Apps created for each partner app carousel include but not limited to the following compatible apps: Android™ APK App, Apple™ iOS App, Panasonic™ TV App, PC Web Site compatible with all major PC browsers, Mobile Web Site compatible with all major mobile browsers, TV Web Site compatible with a specific TV.

Within the system processing modules: Partner Self Serve Web Site 100 allows partners to create an account, and create a new App Carousel Definition. App and Web Site Generator 101 is triggered by the partner using Partner Self Serve Web Site 100 and processes App Carousel Definitions 300 and creates the App Carousel Apps 301. App Carousel Web Server 102 enables the partner to publish the partner's App Carousel Web Sites to the web. App Carousel Web Server 102 makes app carousel generated web sites available to browser based devices such as mobiles phones, tablets, PC's and browser based. TV's. App Carousel Content Server 103 supports the delivery of App Carousel Content to the App Carousel App (for example Android™ App, iOS App or web site).

What follows is an example of a call flow for the system of FIG. 8 wherein, once a partner has decides to create an account, the partner does so on Partner Self Serve Web Site 100. For the purposes of this example the account which is created is a free, i.e. non-premium account. Once the account is created the partner decides to create an App Carousel. All App Carousel's created by the partner are free to the partner.

In step 200 the partner creates an App Carousel Definition by creating an App Carousel Name, selecting an App Carousel Layout Template as the basis of the App Carousel, selecting colors to define the App Carousel Theme, and uploading the partner's logos for App Carousel branding. The App Carousel. Site Type is set to "free" in this example. The partner also defines the App Carousel Content. App Carousel Content is meta data about the apps that will be in the unique app carousel. For example the meta data for each app has information about that app's location in each of the platform app stores (for example the Android™, Apple™, TV, etc app stores).

The partner can change the App Carousel Content associated with an App Carousel Name, so that the next time the consumer activates an App Carousel App the consumer will get the updated App Carousel Content.

In step 200*a* the partner has determined he wants to create a suite of App Carousel Apps and requests App & Web Site Generator 101 to create a set of App Carousel Apps. The request includes the App Carousel Name for which App Carousel Apps should be generated.

In step 202 the App & Web Site Generator 101 uses the supplied App Carousel Name to locate the App Carousel Definition 300 App and Web Site Generator 101 creates the suite of apps and deposits them in App Carousel. Apps database 301. This process involves taking the HTML5 associated with the App Carousel Name and wrapping it with an app platform specific native wrapper to create a stand-alone native app that can be submitted to a platform specific app store. If a platform does not support a HTML5 wrapping, App and Web Site Generator 101 will translate the App Carousel Definition to a format supported by the platform, for e.g. a native app in Objective C. The App Carousel App is compiled to the target platform format.

In step 203, using the Partner Self Serve Web Site 100 portal, the partner can download the App Carousel Apps 301 and prepare them for submission to the platform app store. This step only applies to apps that must be submitted to an app store and does not apply to browser based web apps such as App Carousel PC Web Site.

The following steps are examples of app submissions by the partner to app stores. Thus: In step 204 the partner submits the App Carousel TV App to the Panasonic™ App Store. In step 205 the partner submits the App Carousel Android™ App to the Google™ Play. In step 206 the partner submits the App Carousel iOS App to the Apple™ App Store.

After the apps have been submitted to, and accepted as the case may be, by the various app stores, sometime later a consumer discovers the submitted App Carousel Apps in an app store. For the purposes of this example the consumer has an iPhone™ iOS device 400. Consequently the consumer has discovered the App Carousel iOS App in the Apple™ App Store.

In step 207 the consumer downloads the App Carousel iOS App from the Apple™ App Store 112.

In step 208 the consumer installs and activates the App Carousel iOS App, and it communicates to App Carousel Content Server 103 and provides the App Carousel Name as an identifier.

In step 209 App Carousel Content Server 103 uses the supplied App Carousel Name to fetch App Carousel Content from App Carousel Definition database 300. As stated above App Carousel Content is a set of meta data that identifies specific app products in third party app stores (for example in app stores 110, 111, 112).

In step 210 App Carousel Content Server 103 returns the App Carousel Content to the resident App Carousel iOS App in iPhone™ 400. The App Carousel iOS App identifies the specific apps in App Carousel Content that are compatible with iOS platform and renders them on iPhone™ 400. The App Carousel iOS App renders the selected App Carousel Content as per the corresponding App Carousel Layout Template.

In step 211 the consumer views the App Carousel Content app descriptions on the App Carousel iOS App. The consumer may download an app displayed on App Carousel iOS App. In the case of an Apple™ device such as in this example this triggers the launch of the Apple™ App Store app on the device and it in turn downloads the consumer specified app from the Apple™ App Store.

App Carousel Web Sites are also available for PC, mobile and tablet browsers. For the purposes of this further example consumer PC 401 is used to access the Partner App Carousel using the PC browser. PC 401 requests URL acname.appcarousel.com. The request is routed to App Carousel Web Server 102.

In step 212 App Carousel Web Server 102 uses the 'acname' specified in the sub domain of "acname.appcousel.com" to determine which App Carousel should be accessed. App Carousel. Web Server 102 extracts the App Carousel PC Web Site from App Carousel Apps 301 since the requesting browser is a PC browser.

In step 213 App Carousel Web Server 102 returns the App Carousel PC Web Site to the PC 401 browser. PC 401 Browser renders the App Carousel PC Web Site.

In step 214 the App Carousel PC Web Site connects to App Carousel Partner Content Server 103 and provides the App Carousel Name as an identifier.

In step 215 App Carousel Content Server 103 uses the same logic as in step 209 above to return the App Carousel Content. App Carousel PC Web Site renders the App Carousel Content in a similar manner as does the App Carousel iOS App on iPhone™ 400.

In the above examples the partner submits the App Carousel App manually to the supported App Stores. As would be known to one skilled in the art, this function could be automated by Partner Self Serve Web Site 100.

In the above example iPhone™ 400 was used as a typical device. Thus the example did not detail the Google™ Play and Panasonic™ App Carousel delivery from their respective app stores. However, the Google™ and Panasonic™ cases may and will be inferred by one skilled in the art.

In the above examples the desirable feature and function of blogging and other reviewing of the App carousel apps is omitted. It is understood that blogging by the partner and other third party blogging or reviewing assists the consumer in making a download decision for a particular app, or for the use of a particular app carousel. Consequently in the former instance it is useful for blogged reviews of a particular app to be shown in, or accessed easily from (for example in the corresponding product page), the corresponding app icon or image in the app carousel. This is shown by way of example in the product page of FIG. 4 under the displayed heading "Editors Notes". Thus the blog can accompany the corresponding "App Carousel Description".

In a similar manner, as seen in FIG. 3, a blog or review or notes are available to assist the consumer in selecting the appropriate app carousel under the heading "Editor's Choice" located under the app carousel Title in an app carousel descriptive page which slides at least partially over the representation of the app carousel on the web example of FIGS. 2 and 3.

The above mentioned prior art Lit patent provides a web site with a carousel that displays advertisements. Expedia™ has a rotating carousel and the images in the carousel are managed from the YourDisplayCarousel.com. The app carousel model described in the present specification provides the app carousel creation as a free service to bloggers etc. It is free to them to create an app carousel and is a full self-serve web site in and of itself as opposed to being a carousel on a third party site. It will also create a number of other instances of the app carousel (Android™ App, IPhone™ App, Facebook™ App, TV App, to name some examples) as a service. Although the premium app carousels are paid for, the free or Blogger app carousels are useful for marketing to get press and visibility for the app carousels. This is not however an advertising network. Further, the app carousels according to the present invention will only display apps which are compatible with the consumer device platform. So in an Android™ device, when the consumer selects an icon it is determined at that time in the app carousel that the consumer should be sent to Google™ Play at 111. This is not the typical behaviour of an advertising network which only sends consumers to a single link based on a banner click.

As will be apparent to those skilled in the art in the light of the foregoing disclosure, many alterations and modifications are possible in the practice of this invention without departing from the spirit or scope thereof.

What is claimed is:

1. A method for providing an application carousel comprising the steps of:
   (a) providing a third party partner supplier with a means to create, select or group apps from said supplier in a unique app carousel created by said supplier in a self-serve website, wherein said apps are selected or grouped according to a theme or subject matter that said apps have in common, and wherein said supplier is provided with a means to provide a title for said app carousel and is provided with a means to provide at least review or comments at least in association with a GUI of said app carousel to promote said app carousel;
   (b) providing said supplier access to said unique app carousel, and allowing said supplier to populate said unique app carousel with app icons on a carousel display track, wherein said app icons correspond to said apps, and wherein said track appears graphically on said GUI as an inclined looped rotational track having at least front, rear and front center positions, wherein said track appears inclined away from a user screen viewed by a user so that said app icons at said front of said track, are larger than said icons which have rotated to said rear of said track, wherein said front center position corresponds to a largest said icon, and wherein said icons are linked for display to corresponding content pages, from which an app is selectable for download;
   (c) exposing said app carousel, once said populated with said created or selected apps for location by consumers via electronic devices including those of the group comprising: handsets, smart phones, tablet computers, mobile computers, desktop computers, televisions, display appliances, and associated browsers cooperating therewith;

wherein said supplier includes a content manager and wherein said content manager is provided a space for one or more of the group comprising: summary, description, said comment, said review, blog, and at least further including in said space a third party blog from other than said supplier on some or all of: said app icons viewable on said app carousel, product pages associated with said app icons, said app carousel GUI, a product page associated with said app carousel, whereby the consumer makes a choice assisted by a content of said space including said third party blog.

2. The method of claim 1 wherein said content manager is a blogger.

3. The method of claim 1 wherein said consumer choice is between different said app carousels.

4. The method of claim 1 wherein said consumer choice is between different said apps on said app carousel.

5. The method of claim 1 wherein access to a website for said creation of said app is provided to said supplier.

6. The method of claim 5 wherein said website provides for creation of both said app and an app-functioning website which provides functions of said app.

7. The method of claim 5 wherein said supplier is provided access to a definition database associated with said app carousel having said title.

8. The method of claim 7 wherein said definition database includes at least said title and app carousel content and said supplier is provided access to said content.

9. The method of claim 8 wherein said definition database further includes an app carousel layout template.

10. The method of claim 9 wherein said definition database further includes an app carousel theme and supplier branding.

11. The method of claim 10 wherein said definition database further includes an app carousel type.

12. The method of claim 11 wherein said app carousel type includes at least a free App Carousel and a premium App Carousel.

13. The method of claim 2 wherein said App Carousel is provided at no charge to:
    said consumers, said supplier, said blogger, and is at least partially funded by advertising in association with said app carousel.

14. The method of claim 8 further comprising providing a content server and providing said App Carousel content to said devices.

15. The method of claim 1 wherein a platform associated with said device of the consumer is determined and wherein said App Carousel icons direct the consumer to an app store upon selection of one of said icons by the consumer.

16. The method of claim 15 wherein said app store is an app store corresponding to said platform of said device.

17. The method of claim 8 wherein said app carousel is updated by updating said app carousel content with new said apps after said app carousel has been delivered to one of said electronic devices.

18. The method of claim 17 wherein said supplier uses said self-serve website to said update said apps in said content.

* * * * *